United States Patent [19]

Inoue et al.

[11] Patent Number: 5,248,729

[45] Date of Patent: Sep. 28, 1993

[54] PROCESS FOR PREPARING THERMOPLASTIC RESIN COMPOSITION

[75] Inventors: Toshio Inoue; Shiyuji Kashiwase, both of Kawasaki; Masaaki Miyazaki, Yokohama; Toshitsune Yoshikawa, Kawasaki; Masaaki Kobayashi, Tokyo, all of Japan

[73] Assignee: Nippon Petrochemicals Company Limited, Tokyo, Japan

[21] Appl. No.: 934,184

[22] Filed: Aug. 21, 1992

Related U.S. Application Data

[63] Continuation of Ser. No. 290,362, Dec. 27, 1988, Pat. No. 5,159,016.

[30] Foreign Application Priority Data

Dec. 28, 1987 [JP] Japan .................. 62-332359
Apr. 8, 1988 [JP] Japan .................. 63-85280
May 17, 1988 [JP] Japan .................. 63-118175
May 20, 1988 [JP] Japan .................. 63-121869

[51] Int. Cl.$^5$ .............. C08L 59/00; C08L 77/00; C08L 67/00; C08L 23/26; C08L 23/36
[52] U.S. Cl. .................. 525/92; 525/98; 525/197; 525/941; 524/505
[58] Field of Search .......... 525/92, 98, 194, 193, 525/232, 941, 167, 177, 184; 524/505

[56] References Cited

U.S. PATENT DOCUMENTS

| Re. 32,028 | 11/1985 | Fischer | 525/194 |
|---|---|---|---|
| 3,005,805 | 10/1961 | Minckler, Jr. et al. | 525/297 |
| 3,325,464 | 6/1967 | Weil | 525/297 |
| 3,382,219 | 5/1968 | Trivette, Jr. | 525/332.5 |
| 3,406,142 | 10/1968 | Hawley | 525/275 |
| 3,806,558 | 4/1974 | Fisher | 260/897 A |
| 4,104,210 | 8/1978 | Coran et al. | 260/4 R |
| 4,202,801 | 5/1980 | Petersen | 260/5 |
| 4,722,973 | 2/1988 | Yamaoka et al. | 525/240 |

OTHER PUBLICATIONS

Hytrel ®: Polyester Elastomer: High Performance Thermoplastic Elastomer, Brizzolara, 127th ACS Meeting, Los Angeles, CA, Apr. 23-26, 1985.

*Primary Examiner*—Carman J. Seccuro, Jr.
*Attorney, Agent, or Firm*—Dilworth & Barrese

[57] ABSTRACT

A thermoplastic resin composition is prepared by heat-treating a mixture of a thermoplastic resin substantially containing no olefinic unsaturated carbon-carbon bond and an elastomer having an olefinic unsaturated carbon-carbon bond, dynamically in the presence of a crosslinking agent, characterized in that as said elastomer there is used at least one member selected from the group consisting of styrene-butadiene-styrene block copolymer (SBS), styrene-isoprene-styrene block copolymer (SIS), 1,2-polybutadiene rubber and ethylene-propylene-diene random copolymer (EPDM), and that as said crosslinking agent there is used a dihydroaromatic compound or a polymer thereof.

9 Claims, No Drawings

PROCESS FOR PREPARING THERMOPLASTIC RESIN COMPOSITION

This is a continuation of copending application Ser. No. 07/290,362 filed Dec. 27, 1988, now U.S. Pat. No. 5,159,016.

BACKGROUND OF THE INVENTION

The present invention relates to a process for preparing a novel thermoplastic resin composition. More particularly, the invention is concerned with a process for preparing a thermoplastic resin composition superior in the balance of rigidity, impact resistance and moldability or in the balance of flexibility and moldability.

Thermoplastic resins are widely utilized in the industrial field as materials superior in moldability and the utilization field thereof has been expanded by blending them with elastomers for modification. It is known that the effects of such blends, e.g., improvement of impact resistance and enhancement of rubbery properties are accelerated by heat-treating the blends dynamically. As processes which utilize a dynamic heat treatment there are known a process (prior art process A) which employs a crosslinking agent acting on both thermoplastic resins and elastomers, and a process (prior art process B) which employs a crosslinking agent acting mainly on only elastomers. However, as to compositions prepared by such conventional processes, improvements have been desired in the following points.

PRIOR ART PROCESS A

This process uses a free radical generator typical of which are organic peroxides. An example of this process is shown in U.S. Pat. No. 3,806,558. Where the thermoplastic resin is an organic peroxide non-crosslinked type resin such as polypropylene resin, there will be obtained a composition which exhibits good fluidity in injection molding, but the organic peroxide remaining in the composition causes deterioration of both thermal stability and weathering resistance. There will also occur a thermal decomposition of the organic peroxide rapidly, thus inducing a molecule cutting reaction, and the result is deterioration in mechanical characteristics such as tensile strength at yield flexural strength and flexural modulus. Moreover, where the said composition is used in extrusion or blow molding, there arise problems such as deterioration of anti-drawdown characteristic, and surface roughening and insufficient elongation of parison. Also in injection molding it has been pointed out that the use of the composition in question may affects the glossiness and product appearance. As to organic peroxide crosslinked type resins such as polyethylene resins, it has been impossible to apply this prior art process A thereto because the resulting composition would be markedly deteriorated in its fluidity. Further, problems involved in this prior art process have been poor stability and safety of the free radical generator during storage and dynamic heat treatment as well as cleavage of peroxide due to adhesion thereof to a hot inner wall of a processing machine. It has been desired to solve these problems.

PRIOR ART PROCESS B

This process is suggested in the foregoing U.S. Patent, but its details are found in the following prior art literatures.

As a first process, there is used a crosslinking agent comprising sulfur, and this is proposed in U.S. Pat. No. 4,130,535. However, a dynamic heat-treatment using a sulfur crosslinking agent which involves the formation of sulfur radical causes the emission of a terrible offensive odor at ordinary kneading temperatures; besides, the resulting composition will also give off an offensive odor. This offensive odor of the composition will be developed again in a plasticizing step during molding, thus causing marked deterioration of the commodity value. Further, since the composition is colored in deep yellowish red, the degree of freedom in coloring the composition is restricted, and there may occur discoloration due to bleeding of a sulfur compound during use over a long period, thus resulting in limited field of application.

As a second process, there is used a crosslinking agent comprising a halogenated phenol resin or a phenolformaldehyde resin with a halide added thereto. This is proposed in U.S. Pat. No. 4,311,628 and Japanese Patent Publication No. 19421/1979. However, since active halogen is liberated during the crosslinking reaction, the resulting composition becomes discolored to black and hence the coloring freedom is lost. It is difficult to say that the fluidity of the composition obtained by using such crosslinking agent is good.

As a third process, there is used a quinone dioxime compound as the crosslinking agent, and this is proposed in the above Japanese patent publication 19421/1979. However, since quinone dioximes are dark purple, the coloring freedom of the resulting composition is greatly restricted, and a stimulative odor is emitted in the dynamic heat treatment. Further, it is difficult to say that the fluidity of the composition obtained by this process is good during molding and processing.

As a fourth process, a bismaleimide compound or a combination thereof with a thiazole compound is used in U.S. Pat. Nos. 4,104,210 and 4,130,535. In the former patent, N,N'-m-phenylene bismaleimide is used for a highly unsaturated diene rubber, but it is necessary to use a large amount of the crosslinking agent in order to attain a desired crosslinking effect, thus causing coloration of the resulting composition and bleeding of unreacted portion. The latter patent, also uses N,N'-m-phenylenebismaleimide for polypropylene/EPDM, but with respect to the effect of modification by a dynamic heat treatment, an extremely unsatisfactory result is reported therein. Since bismaleimide compounds are generally expensive, the addition thereof in a large amount causes an increase of cost.

Thus, in crosslinking unsaturated elastomer using the conventional crosslinking agent, the crosslinking agents cause decomposition, side reaction, emission of an offensive odor and coloration during the dynamic heat treatment, or it is necessary to use them in a relatively large amount. Due to these drawbacks, none of the prior art processes can be said fully satisfactory. Under the circumstances, it has been desired to develop a superior crosslinking agent and an improved process for preparing a thermoplastic resin composition using such crosslinking agent.

SUMMARY OF THE INVENTION

In view of the above-mentioned points the present invention aims at preparing an improved thermoplastic resin composition by crosslinking a mixture of a thermoplastic resin and an elastomer using a crosslinking agent capable of remedying the drawbacks of the conventional crosslinking agents as far as possible and affording a high crosslinking reactivity in a small amount of the crosslinking agent used.

Having made extensive studies for the aforesaid object, we found that by using a dihydroaromatic compound as a crosslinking agent in crosslinking a mixture of a saturated thermoplastic resin and an unsaturated elastomer, there could be obtained remarkably excellent effects as compared with the use of conventional crosslinking agents. On the basis of this finding we reached the present invention.

More specifically, the present invention provides a process for preparing a thermoplastic resin composition by heat-treating a mixture comprising a thermoplastic resin (A) substantially containing no olefinic unsaturated carbon-carbon bond and an elastomer (B) having an olefinic unsaturated carbon-carbon bond, dynamically in the presence of a crosslinking agent, characterized in that as the elastomer (B) there is used at least one member selected from the group consisting of styrene-butadiene-styrene block copolymer (SBS), styrene-isoprene-styrene block copolymer (SIS), 1,2-polybutadiene rubber, and ethylene-propylene-diene random copolymer (EPDM), and that a dihydroaromatic compound or a polymer thereof (a) is used as the crosslinking agent.

DETAILED DESCRIPTION OF THE INVENTION

The present invention will be described in detail hereinunder.

The component (A) used in the present invention can be selected widely from resins which substantially contain no olefinic unsaturated carbon/carbon bond. Examples are polyolefin resins such as crystalline polypropylenes, propylene-α-olefin random copolymers, high-density polyethylenes, high-pressure process low-density polyethylenes, linear low-density polyethylenes, ultra-low-density polyehtylenes (density: not higher than 0.910 g/cm$^3$), ethylene-α-olefin copolymer rubbers, and ethylene-unsaturated carboxylate copolymers, as well as polystyrene resins, polyacrylonitrile resins, polymethacrylate resins, polyamide resins, polyester resins, polyacetal resins, and mixtures thereof. Particularly, polyolefin resins and polystyrene resins are preferred in view of the compatibility with the later-described elastomer and characteristics of the resulting compositions. The term "ultra-low-density polyethylene (ULDPE)" means a polyethylene resin having a density not higher than 0.910 g/cm$^3$ and properties between those of linear -low-density polyethylene and those of ethylene-α-olefin copolymer elastomer.

An example of ULDPE is a ethylene-α-olefin copolymer obtained by copolymerizing ethylene with an α-olefin having 3 to 12 carbon atoms in the presence of a catalyst consisting essentially of a solid material and an organo-aluminum compound which solid material contains magnesium and titanium and/or vanadium, said ethylene/α-olefin copolymer having the following properties (i)-(iv):

| (i) | Density | 0.860-0.910 g/cm$^3$ |
| --- | --- | --- |
| (ii) | Maximum peak temperature (Tm) as measured according to a differential scanning calorimetry (DSC) | not lower than 100° C. |
| (iii) | Insolubles in boiling n-hexane | not less than 10 wt % |

This specific ethylene-α-olefin copolymer has high crystalline portions characteristic of the linear-low-density polyethylene and non-crystalline portions characteristic of the ethylene-α-olefin copolymer elastomer and accordingly is superior both in mechanical strength and heat resistance characteristic of the linear-low-density polyethylene and in elasticity and low temperature impact resistance characteristic of the ethylene-α-olefin copolymer rubber.

A density of this specific copolymer lower than 0.860 g/cm$^3$ would cause a lowering in toughness. A Tm thereof lower than 100° C. would cause a lowering of tensile strength and create a surface stickiness. The content of insolubles in boiling n-hexane thereof less than 10 wt % would cause a lowering of tensile strength and create a surface stickiness.

As the component (B), among elastomers having an olefinic unsaturated carbon-carbon bond, there is used any member selected from styrene-butadiene-styrene block copolymer (SBS), styrene-isoprene-styrene block copolymer (SIS), 1,2-polybutadiene rubber, and ethylene-propylene-diene random copolymer (EPDM). Generally, as elastomers having an olefinic unsaturated carbon-carbon double bond there are included, in addition to those just enumerated above, natural rubber, isoprene rubber, butadiene rubber, styrene-butadiene random copolymer rubber (SBR), chloroprene rubber, nitrile rubber and butyl rubber, but in the present invention the aforesaid four kinds of elastomers are selected. The first reason is that these elastomers are superior in thermoplasticity and easily dispersed by melt-kneading as compared with the other elastomers. The second reason is that in SBS and SIS their unsaturated bonds are present locally and also in 1,2-polybutene and EPDM their like bonds are localized in the side chain portion, so all of them are easy to react with the crosslinking agent. As the third reason, these four kinds of elastomers have no peculiar offensive odor as compared with SBR, isoprene rubber, nitrile rubber and butadiene rubber; they are easy to weigh and handle at the time of blending because of being obtainable in the form of pellets; and also with respect to the type of composition preparing apparatus, the degree of selection freedom is high, and thus there are advantages in operation. Additionally, in the cases of SBR and butadiene rubber, a crosslinking reaction induced by a bismaleimide compound for example is difficult to proceed and the resulting composition is poor in fluidity in injection molding.

The elastomers employable in the invention may be used alone or as a mixture of two or more.

Among the four kinds of elastomers employable in the invention, EPDM is particularly preferred because it is very effective in modifying the resin of the component (A), applicable to a wide variety of resins, stable at a high melt-kneading temperature and affords a composition superior in heat resistance and weathering resistance. The diene component contained in EPDM is not specially limited. Any of such commercially available dienes as ethylidiene norbornene, dicyclopentadiene and 1,4-cyclohexadiene is employable.

Among combinations of components (A) and (B), combination of polypropylene resin and EPDM is particularly preferred in the balance of processability, heat resistance and low-temperature impact resistance.

The proportions of components (A) and (B) are 98-10 wt %, preferably 95-30 wt %, of (A) and 2-90 wt %, preferably 5-70 wt %, of (B). A larger proportion of component (B) in the composition will cause a consecutive change from a composition superior in the balance of rigidity, impact resistance and fluidity in large-size injection molding to an elastomeric composition superior in the balance of flexibility and fluidity, so suitable proportions may be selected from the above ranges according to purposes. If the proportion of component (B) is less than 2 wt %, the impact resistance will not be improved to a satisfactory extent and a proportion thereof exceeding 90 wt % will result in markedly deteriorated fluidity during molding.

By changing the kind and proportion of component (A) the process of the present invention can be applied to the preparation of a wide range of crosslinked thermoplastic resin compositions having various characteristics. For example, where the component (A) is a crystalline polypropylene resin, a high-density polyethylene resin or a polystyrene resin and the component (A)/component (B) ratio (wt %) is in the range of 98-60-/2-40, there will be obtained a thermoplastic resin composition which exhibits high impact resistance and high elongation while maintaining heat resistance, rigidity and moldability at sufficiently high values. If an ultra-low-density polyethylene is used as component (A) in the same proportion as above, there will be obtained a thermoplastic resin composition which exhibits high tensile strength, heat-and abrasion resistance while maintaining flexibility, especially low-temperature flexibility, and moldability at sufficiently high values. Further, if the proportion of component (B) is increased to 60-10/40-90 in terms of component (A)/component (B)ratio (wt %), then for a wide variety of components (A) there will be obtained thermoplastic resin compositions superior in tensile characteristics, heat resistance, glossiness and oil resistance while maintaining low-temperature flexibility and moldability at sufficiently high values.

The crosslinking agent used in the present invention participates mainly in the crosslinking reaction of component (B), causing no substantial change of component (A), as will be described later, so by using a suitable combination as component (A) their properties can be imparted directly to the resulting composition. Particularly, a combination of a crystalline polypropylene and an ultra-low-density polyethylene can afford very superior properties. For example, when flexibility of a crosslinked composition comprising a crystalline polypropylene and EPDM is to be enhanced, if a softener is added, or the amount of EPDM is increased, or if there is used a low-density polyethylene or a linear low-density polyethylene, there will surely arise problems such as deterioration of heat resistance and of mechanical strength. But the addition of an ultra-low-density polyethylene will not give rise to such problems; even if there should arise such problems, they will be insignificant and the problems involved in low-temperature, impact resistance, elongation of parison and anti-drawdown characteristics will be remedied.

The dihydroaromatic compounds used as a crosslinking agent in the present invention indicates a compound containing one or more aromatic rings at least one of which has been converted to dehydro form. The aromatic ring as referred to herein indicates a ring structure having 4n+2 (n being an integer) $\pi$-electrons, e.g., pyridine and quinoline, as stated in the definition of aromaticity [see, for example, Richard S. Monson & John C. Shelton, Fundamentals of Organic Chemistry, MacGraw-Hill, Inc. (1974)]. Thus examples of the dihydroaromatic compounds used in the present invention include dehydro derivatives of quinoline. Moreover, the dihydroaromatic compound used in the invention may contain a substituent group; there may be used alkyl-substituted dihydroaromatic compounds as well as derivatives substituted with various elements or functional groups. These dihydroaromatic compounds can be prepared by the application of known chemical reactions. Commercially available examples include 1,2-dihydrobenzene, cis-1,2-dihydrocatechol, 1,2-dihydronaphthalene, 9,10-dihydrophenanthrene, as well as 1,2-dihydroquinoline compounds such as 6-decyl-2,2,4-trimethyl-1,2-dihydroquinoline, 6-ethoxy-2,2,4-trimethyl-1,2-dihydroquinoline and 2,2,4-trimethyl-1,2-dihydroquinoline. Polymers of these compounds are also employable.

In the examples of component (a) used in the present invention there are included those which have heretofore been known as antioxidants for rubber (see, for example, U.S. Pat. No.4,104,210), but there has been no example of their use as crosslinking agents. They have been used together with other crosslinking agents such as, for example, sulfur compounds, quinone dioxime compounds, phenolic resin compounds, or organic peroxides, and thus they have so far not been effective in the process of the present invention.

It is presumed that the component (a) used as the crosslinking agent will act on the unsaturated bond of component (B) to form carbon radical, and after release of radical from itself, it will be stabilized exhibiting a resonance structure. The carbon radical thus formed is weak in its hydrogen extractability in ordinary carbon-hydrogen bond as compared with the oxygen radical formed by the foregoing cleavage of an organic peroxide, so it is presumed that the allylic hydrogen in the component (B) will be mainly extracted, allowing crosslinking to proceed only with component (B), causing no substantial change of component (A).

Although the component (a) may be used as such, as mentioned above, there also may be used compounds which will be converted to component (a) in situ by reaction during melt-kneading. The said reaction may be selected suitably, but preferably it starts from a compound which reacts easily on heating, in order to avoid the addition of a catalyst, etc. Particularly, Diels-Alder reaction is preferred. For example, it is presumed that if SBS and divinylbenzene are melt-kneaded, there will be produced a dehydroaromatic compound by the reaction of the unsaturated bond in SBS with divinylbenzene and also by intermolecular reaction of divinylbenzene. In this case, however, the addition in the form of a dehydroaromatic compound is preferred.

As the crosslinking agent used in the present invention, the component (a) described above may be used together with other polyfunctional monomers. Examples of such monomers include higher esters of methacrylic acid typical of which are trimethylolpropane trimethacrylate and ethyleneglycol dimethyacrylate; polyfunctional vinyl monomers typical of which are divinylbenzene, triallyl cyanurate and diallyl phthalate; and bismaleimides typical of which are N,N'-m-phenylenebismaleimide and N,N'-ethylenebismaleimide. Among these, bismaleimides are preferred because they enhance the effect of dynamic heat treatment as will be described later. These monomers may be used in combination of two or more. Further, in order to enhance their effect there may be added a benzothiazole compound or a benzothiazolylsulfenamic compound as an activator, if necessary.

In the present invention, a mixture of three or more components obtained as described above is subjected to a dynamic heat treatment to obtain a resin composition. The "dynamic heat treatment" means that the said mixture is melt-kneaded to increase the boiling xylene insolubles content in the composition after kneading as compared with the value before kneading. The effects of the present invention can be attained by this heat treatment. Generally, the higher the boiling xylene insolubles content, the greater the improvement in various effects, including improved impact resistance. According to differential scanning calorimetry for the xylene insolubles it is seen that the main component is component (B), with small peak of component (A). And the xylene insolubles content does not substantially exceed the amount of component (B) added. From these facts, the dynamic heat treatment as referred to herein can be regarded as crosslinking the component (B).

The dynamic heat treatment temperature should be above the melting point or softening point of component (A) and below the decomposition point thereof. In melt-kneading the mixture it is desirable to use a mixture which affords a high shear rate so as to permit easy formation of radical in the mixture.

Increase of the boiling xylene insolubles content is caused mainly by increased in the amount of the crosslinking agent added, and the amount to be added can be selected suitably. That is, an appropriate amount thereof is selected according to the kind of the crosslinking agent and that of the activator used and also according to melt-kneading apparatus and conditions. If the crosslinking agent is used in excess, there will occur bleeding of the added agent, coloration of the resulting composition, or increase of cost. So the upper limit of the amount of the crosslinking agent to be added may be determined in consideration of those points. A practical amount of the crosslinking agent and activator if used is usually in the range of 0.01 to 5 parts by weight, preferably 0.05 to 3 parts by weight, based on 100 parts by weight of component (B).

In order to enhance the effect of the dynamic heat treatment it is desirable that the components (A) and (B) be melt-kneaded and dispersed as uniformly as possible in advance of start of the crosslinking reaction. Particularly, in order to obtain a composition superior in the balance of glossiness, fluidity in large-sized injection molding and impact resistance, it is desirable to adopt the following as the method for selecting and mixing the components (A) and (B).

For the improvement of impact resistance it is desirable that the component (B) be as fine particles as possible and form a uniformly dispersed phase in a continuous phase of the component (A). And for reducing the particle size of component (B), a smaller melt flow rate (MFR) of component (A) is more effective. For example, in the case where the component (A) is a polypropylene resin, its melt flow rate is not higher than 8 g/10 min, preferably not higher than 4 g/10 min, under the condition of JIS K6758 (temperature: 230° C., load: 2.16 kg), and in the cases of high-density polyethylene resins and polystyrene resins, their melt flow rates are not higher than 8 g/10 min, preferably not higher than 4 g/10 min, under the conditions of JIS K6760 (temperature: 190° C., load: 2.16 kg). On the other hand, for improving the glossiness of the resulting composition and fluidity in large-sized injection molding, it is advantageous to use a component (A) whose MFR is somewhat large. In view of this point, if as component (A) there are selected two kinds of components which are a component ($A_1$) having a smaller MFR and a component ($A_2$) having a larger MFR, then components ($A_1$) and (B) are melt-kneaded allowing component (B) to be dispersed thoroughly, thereafter component ($A_2$) and the crosslinking agent are added to the resulting mixture, followed by a dynamic heat treatment of the mixture, there will be obtained a composition having well-balanced properties. In order for the process of the invention to be effective it is necessary that the proportions or properties of the three components ($A_1$), ($A_2$) and (B) be in certain ranges.

In the first step of the preparation, there is selected a component ($A_1$) having a suitable MFR and the proportions of ($A_1$) and (B) are limited to those within the following ranges, assuming that the total amount of both components is 100 parts by weight:

($A_1$): 93–40 parts by weight
(B): 7–60 parts by weight

If the amount of component (B) exceeds 60 parts by weight, it will become difficult to maintain a good dispersed state and preferably it is not larger than 50% by weight. On the other hand, if the amount of (B) is smaller than 7 parts by weight, it will be impossible to expect the effect of improvement in impact resistance.

In the second step, it is necessary that the component ($A_2$) added in the dynamic heat treatment be in the following relation to the component ($A_1$) with respect to MFR and the amount thereof to be added:

MFR of ($A_2$)/MFR of ($A_1$) = 5–80, preferably 8–70.
Weight of ($A_2$)/Weight of ($A_1$) $\geq$ 0.3

The composition wherein the component ($A_2$) does not satisfy the above relationships with respect to the component ($A_1$) will not be so improved in glossiness and fluidity in large-sized injection molding.

Thus, in the process of the present invention, a good dispersed state of component (B) can be attained to thereby, effect the improvement of impact resistance and at the same time the glossiness and fluidity can also be improved by selecting components ($A_1$) and ($A_2$) having specific MFR values and satisfying specific relationships thereof and by suitably determining the amounts and sequence of both components to be added.

As the melt-kneading apparatus for the dynamic heat treatment, there may be used a known apparatus such as, for example, open type mixing rolls, a closed type Bambury mixer, an extruder, a kneader, or a twin-screw extruder In the foregoing proportions of the components the process of the invention is carried out preferably under the conditions of a temperature in the range of 120° to 350° C. and a heat treatment time in the range of 20 seconds to 20 minutes.

In the present invention, moreover, there may be used a softener for the improvement of moldability and flexibility. As mineral oil softeners there may be used those commonly called extender oils which are employed in processing rubber mainly for the purpose of improving processability, obtaining the extending effect or improving the dispersibility of filler. These are high-boiling petroleum components and are classified into paraffinic, naphthenic and aromatic oils. Not only these petroleum fractions but also synthetic oils such as liquid polyisobutene are also employable in the process of the invention. The amount of the softener to be used is in the range of 5 to 300 parts by weight, preferably 20 to 150 parts by weight, based on 100 parts by weight of component (B). If it is less than 5 parts by weight, the addition of the softener will not be effective, while if it exceeds 300 parts by weight, there will be marked deterioration in both strength and heat resistance. When the softener is to be added is not specially limited, but preferably it is added at the time of melt-kneading of components (A) and (B).

The composition of the present invention may contain, if necessary, fillers such as stabilizer, antioxidant, ultraviolet absorber, lubricant, foaming agent, antistatic agent, flame retardant, plasticizer, dye, pigment, as well as talc, calcium carbonate, carbon black, mica, glass fiber, carbon fiber, aramid resin and asbestos.

According to the present invention, by using the crosslinking agent free of such drawbacks as the emission of offensive odor, coloration and decomposition as found in conventional crosslinking agents and exhibiting a high crosslinking-reactivity in a relatively small amount thereof, it becomes possible to remarkably improve the crosslinking of the thermoplastic resin composition-unsaturated elastomer mixture.

The present invention will be described below more concretely in terms of working examples, but it is to be understood that the invention is not limited thereto.

EXAMPLES 1-29 AND COMPARATIVE EXAMPLES 1-24

As component (A) there was used 65-90 wt % [assuming that the total amount of components (A) and (B) is 100wt %, also in the following] of a polypropylene resin, a high-density polyethylene resin, a polystyrene resin, a polyamide resin or a polyester resin. Test specimens were obtained by injection molding and subsequent annealing, unless otherwise described.

How to prepare composition, conditions for producing test specimen by injection molding and testing method are as follows:

HOW TO PREPARE COMPOSITION

1) Predetermined proportions components (A) and (B) were mixed by a Henschel mixer.

2) The mixture thus obtained was melt-kneaded at a resin temperature of 180°-260° C. and at a revolution of 200 rpm, using a continuous twin-screw extruder (30 mm dia., manufactured by Research Laboratory of Plastics Technology).

3) A predetermined amount of a crosslinking agent was added to the mixture thus melt-kneaded, followed by mixing under agitation by a Henschel mixer.

4) The mixture thus obtained was melt-kneaded by the continuous twin-screw extruder used in 2) and thereby heat-treated dynamically. During this melt-kneading operation, the composition temperature at the extruder outlet and the residence time in the extruder were measured and controlled to adjust conditions, which temperature and residence time are shown as heat treatment conditions in Table 2-4. The composition temperature was measured by a thermometer equipped in the extruder.

CONDITIONS FOR INJECTION MOLDING

Molding machine: IS-90B (manufactured by Toshiba Machine Co., Ltd.
Injection pressure: 1,000 kg/cm$^2$
Molding temperature: 180°-260° C.
Mold temperature: 50° C.

TESTING AND MEASURING METHODS (MFR) according to JIS K6760, JIS K6758, JIS K7210
(Tensile strength at Yield) and (Elongation at Break) according to JIS K6760, JIS K6758, JIS K7113
(Flexural Modulus) according to JIS K6758, JIS k7203
(Vicat Softening Temperature) according to JIS K6760, JIS K6758, JIS K7206
(Izod Impact Strength) according to JIS K6758, JIS K7110
(Boiling Xylene Insolubles Content)

A 20 mm×50 mm×0.2 mm film was obtained by pressing, placed in a 120-mesh wire gauze and immersed in boiling xylene for 5 hours. It was measured for weight before and after the immersion and its boiling xylene insolubles contents was determined using the following equation:

$$\text{Boiling xylene insolubles contents (wt \%)} = \frac{\text{Film weight (g) after immersion in boiling xylene}}{\text{Film weight (g) before immersion in boiling xylene}} \times 100$$

CRYSTALLIZATION TEMPERATURE

Measured as an index of cycle time in injection molding. The higher the crystallization temperature, the higher the crystallization speed, so it can be considered that the cycle time in injection molding can be shortened. Using a differential scanning calorimeter (Model SSC/580, a product of Soiko Instruments Inc.) for the measurement, about 10 mg of sample was held at 210° C. for 5 minutes, then cooled at a cooling rate of 10° C./min and the temperature exhibiting a maximum peak of the resulting exotherm curve was measured as a crystallization temperature.

Using the following resins as components (A) and using as components (B) and crosslinking agents those described in Tables 2 to 4 out of those shown in Table 1, compositions were prepared with the components' proportions and heat treatment conditions set forth in Tables 2 to 4. Further, test specimens were obtained by injection molding and subjected to tests. The results are as set out in Tables 2 to 4.

COMPONENTS (A)

($A_1$) Polypropylene (1) (trade name: Nisseki Polypro J620G, a product of Nippon Petrochemicals Co., Ltd.)

($A_2$) Polypropylene (2) (trade name: Nisseki Polypro J120G, a product of Nippon Petrochemicals Co., Ltd.)

($A_3$) Polypropylene (3) (trade name: Nisseki Polypro J871M, a product of Nippon Petrochemicals Co., Ltd.)

($A_4$) Polypropylene (4) (trade name: Nisseki Polypro J650G, a product of Nippon Petrochemicals Co., Ltd.)

($A_5$) High-density polyethylene (MFR: 0.3 g/10 min (190° C.), density: 0.961 g/cm$^3$, trade name: Nisseki Staflene E703, a product of Nippon Petrochemicals Co., Ltd.)

($A_6$) Polystyrene (trade name: Toporex 525, a product of Mitsui Toatsu Chemicals, Inc.)

(A₇) Nylon-6 (trade name: Amilan CM1021, a product of Toray Industries, Inc.)

(A₈) Polybutylene terephthalate (trade name: PBT 310, a product of Toray Industries, Inc.)

The Proportions of the crosslinking agents shown in Tables 2 to 4 are based on the total amount of 100 parts by weight of components (A) and (B) (also in the following tables).

EXAMPLES 30-37 AND COMPARATIVE EXAMPLES 25-31

As component (A) there was used an ultra-low-density polyethylene in an amount of 70 to 90 wt %. Test specimens were each punched out in a predetermined sizes from a plate of 100 mm × 200 mm × 2 mm which had been obtained by injection molding, unless otherwise described. Compositions were prepared in the same manner as above except that in the melt-kneading step 2) of the preparation process the resin temperature range was changed to 150°–20° C. and, where required, a mineral oil or synthetic oil softener was fed from a reciprocating displacement pump using a vent hole as an inlet.

The following are conditions for making rest specimens by injection molding and additional testing methods.

CONDITIONS FOR INJECTING MOLDING

Molding machine: IS-90B (manufactured by Toshiba Machine Co., Ltd.)
Injection pressure: 500–1,000 kg/cm²
Molding temperature: 180°–230° C.
Mold temperature: 30°–50° C.

ADDITIONAL TESTING AND MEASURING METHODS (High-load MFR) according to JIS K7210. temperature: 230° C., load: 10 kg
(Tensile Strength at Break) and (Elongation at Break) according to JIS K6301. speed of testing: 200 mm/min
(Durometer Hardness, H$_D$A) according to ISO 868
(Permanent Elongation) according to JIS K6301. elongation: 100%, using No.3 dumbbell specimen
(Vicat Softening Temperature) according to JIS K7206. load: 250 g
(Brittle Temperature) according to JIS K6760, JIS K7216
(Abrasion Resistance) according to JIS K7204 (using a Taber abraser). load: 1,000 g, 1,000 consecutive rotations
(How to Measure Maximum Peak Temperature (Tm) by Differential Scanning Calorimetry (DSC))

Measured as the melting point of an ultra-low-density polyethylene. A sample of about 5 mg is weighed accurately from a hot-pressed 100 μm thick film, then set on a differential scanning calorimeter, then the temperature is raised to 170° C., at which, temperature the sample is held for 15 minutes, followed by cooling down to 0° C. at a cooling rate of 2.5° C./min. Then, from this state, the temperature is raised to 170° C. at a rate of 10° C./min and the vertex position of the maximum peak out of peaks observed during the heat-up from 0° C. to 170° C. is regarded as Tm.

HOW TO MEASURE BOILING N-HEXANE INSOLUBLES CONTENT

A 200 μm thick sheet is formed using a hot press, from which three 20 mm × 30 mm sheets are cut out and extracted in boiling n-hexane using a Soxhlet's extractor for 5 hours. n-Hexane insolubles are withdrawn and vacuum-dried (7 hr, 50° C.), thereafter the boiling n-hexane insolubles content is calculated using the following equation:

Boiling n-hexane insolubles content (wt %) =

$$\frac{\text{Sheet weight after extraction}}{\text{Sheet weight before extraction}} \times 100$$

Using the following component (A) and also using as component (B) and crosslinking agents those described in Table 5 out of those shown in Table 1, compositions were prepared at the components' proportions and dynamic mixing conditions shown in Table 5. Further, test specimens were prepared by injection molding and subjected to tests. The results are as set forth in Table 5.

COMPONENT (A)

(A₁) Ultra-low-density polyethylene

Ethylene and 1-butene were copolymerized to obtain an ethylene-1-butene copolymer, using a catalyst comprising a solid catalyst component and triethylaluminum which solid catalyst component had been prepared using substantially anhydrous magnesium chloride, 1,2-dichloroethane and titanium tetrachloride. The ethylene-1-butene copolymer had a 1-butene content of 12 mol % and it was of the following properties:
Density: 0.896 g/cm³
Tm by DSC: 120° C,
Boiling n-hexane
insolubles content: 74 wt %
MFR: 0.9 g/10 min The softer's proportion in Table 5 is based on the total amount of 100 parts by weight of components (A) and (B) (also in the following tables).

EXAMPLES 38-51 AND COMPARATIVE EXAMPLES 32-37

Various polyolefin resins or mixtures thereof were used as components (A) in amounts of 42–55 wt %. How to prepare compositions and test specimens as well as conditions for making test specimens by injection molding are the same as in the above Examples 30-37.

Additional testing and measuring methods are as follows:

ADDITIONAL TESTING AND MEASURING METHODS (Tensile Strength at Yield) according to JIS K6760, JIS K6758, JIS K7113. speed of testing: 200 mm/min
(Oil Resistance) according to JIS K6301 (immersion test)
(Glossiness) according to JIS Z8741. Measured at an incidence angle of 45°.
(Flow Mark)

The surface of the foregoing injection-molded plate was visually evaluated for wavy mark.

SURFACE ROUGHENING OF PARISON

Parison was formed by a blow molding extruder and its surface was evaluated visually.

The following three marks were used in the evaluation of flow mark and that of parison surface roughening:

⊚: Very Good,
○: Good,
X: Bad

Using the following resins as components (A) and also using as components (B) and crosslinking agents those described in Table 6 out of those shown in Table 1, compositions were prepared at the components' proportions and heat treatment conditions shown in Table 6. Further, test specimens were prepared by injection molding and subjected to tests. The results are as set forth in Table 6.

COMPONENTS (A)

($A_1$) Polypropylene (1) (trade name: Nisseki Polypro J120G)
($A_2$) Polypropylene (2) (trade name: Nisseki Polypro J170G)
($A_3$) High-density polyethylene (trade name: Nisseki Staflene E703)
($A_4$) Linear low-density polyethylene (trade name: Nisseki Linirex AJ5410
($A_5$) Ultra-low-density polyethylene (density: 0.900 g/cm, trade name: Nisseki Softrex D9005)

(All of the above components (A) are products of Nippon Petrochemicals Co., Ltd.)

EXAMPLES 52-59 AND COMPARATIVE EXAMAPLES 38 and 39

As component (A) there was used 67 wt % of a polypropylene resin alone or 70-75 wt % of a mixture of a polypropylene resin (40-67 wt %) and an ultra-low-density polyethylene (10-30 wt %). How to prepare compositions and test specimens as well as conditions for making test specimens by injection molding are the same as in Examples 30-37.

Additional testing and measuring methods are as follows:

ADDITIONAL TESTING AND MEASURING METHODS

Spiral Flow

Samples were injected under the following molding conditions, into a mold having a specified spiral cavity, and the thus-molded spirals, were measured for length to determine the melt-flow characteristics of the samples.

CONDITIONS FOR INJECTION MOLDING

Molding machine: IS-90B (manufactured by Toshiba Machine Co., Ltd.)
Injection pressure: 1,000 kg/cm$^2$
Molding temperature: 230° C.
Stroke: 25 mm
Injection time: 15 sec
Curing time: 10 sec
Interval time: 3 sec
Mold: Archimedean type, temperature: 50° C.
(Flexural Strength) according to JIS K6758, JIS K7203 (Durometer Hardness, $H_DD$) according to JIS K6760, JIS K7215

(Surface Roughness and Elongation of Parison)

Parison was formed using a blow molding extruder in the same manner as above and its surface and state of elongation were evaluated visually. The following three marks were used in the evaluation:

⊚: Very Good,
○: Good,
X: Bad

Using the following resins as components (A) and also using as components (B) and crosslinking agents those described in Table 7 out of those shown in Table 1, the components were prepared, at the components' proportions and heat treatment conditions shown in Table 7. Further, test specimens were prepared by injection molding and subjected to tests. The results are as set forth in Table 7.

COMPONENTS (A)

($A_1$) Polypropylene (1) (trade name: Nisseki Polypro E110G, a product of Nippon Petrochemicals Co., Ltd.)
($A_2$) Polypropylene (2) (trade name: Nisseki Polypro E610G, a product of Nippon Petrochemicals Co., Ltd.)
($A_3$) Polypropylene (3) (trade name: Nisseki Polypro J650G, a product of Nippon Petrochemicals Co., Ltd.)
(A ) Ultra-low-density polyethylene (1) In the same manner as ($A_1$) used in Examples 30-37, ethylene and 1-butene was copolymerized to produce an ethylene-1-butene copolymer. The 1-butene content of the copolymer thus obtained was 9.5 mol % and the properties were as follows:
Density: 0.901 g/cm$^3$
Tm according to DSC: 120° C.
Insolubles in boiling n-hexane: 80 wt %
MFR: 0.5 g/10 min
($A_5$) Ultra-low-density ,polyethylene (2)
In the same manner as ($A_1$) used in Examples 30-37, ethylene and 1-butene was copolymerized to produce an ethylene-1-butene copolymer. The 1-butene content of the copolymer thus obtained was 9.5 mol % and the properties were as follows:
Density: 0.906 g/cm$^3$
Tm according to DSC: 121° C.
Insolubles in boiling n-hexane: 82 wt %
MFR: 5 g/10 min

EXAMPLES 60-67 AND COMPARATIVE EXAMPLES 40-52

Using as components (A) two kinds of components ($A_1$) and ($A_2$) having smaller and larger MFR values, respectively, first components ($A_1$) and (B) were melt-kneaded, then ($A_2$) and crosslinking agent were added and a dynamic heat treatment was carried out. How to prepare test specimens and conditions for making test specimens by injection
molding are the same as in Examples 1-29.

For preparing compositions, the following two kinds of processes were used for comparison.

COMPOSITION PREPARING PROCESS (NO. 1)

1) Predetermined proportions of components ($A_1$) and (B) were mixed by a Henschel mixer.

2) The mixture thus obtained was melt-kneaded at a resin temperature of 150°–180° C. and at a revolution of 200 rpm, using a continuous twin-screw extruder (30 mm dia., manufactured by Research Laboratory of Plastics Technology).

3) Predetermined amounts of component ($A_2$) and crosslinking agent were added to the mixture thus melt-kneaded, followed by mixing under agitation by a Henschel mixer.

4) The mixture thus obtained was melt-kneaded by the continuous twin-screw extruder used in 2) and thereby heat-treated dynamically. During this operation, the composition temperature at the extruder outlet and the residence time in the extruder were measured and controlled to adjust conditions, which temperature and residence time are shown as heat treatment conditions in Table 8.

COMPOSITION PREPARING PROCESS (NO. 2)

1) Predetermined proportions of components ($A_1$), ($A_2$) and (B) were mixed by a Henschel mixer.

2) The mixer thus obtained was melt-kneaded using the same extruder and conditions as in the process (No. 1).

3) A predetermined amount of a crosslinking agent was added to the mixture thus melt-kneaded, followed by mixing under agitation by a Henschel mixer.

4) The mixture thus obtained was melt-kneaded for dynamic heat-treatment by means of the above extruder. The other conditions were the same as in the process (No. 1).

Using the following components ($A_1$), ($A_2$) and also using as components (B) and crosslinking agents those described in Table 8 out of those shown in Table 1, compositions were prepared at the components' proportions and heat treatment conditions set forth in Table 8. Further, test specimens were prepared by injection molding and subjected to tests. The results are as set out in Table 8.

COMPONENTS ($A_1$)

($PP_1$) Polypropylene (1) MFR: 1 g/10 min, trade name: Nisseki Polypro J120G, a product of Nippon Petrochemicals Co., Ltd.)
($PP_2$) Polypropylene (2) (MFR: 4 g/10 min, trade name: Nisseki Polypro J130G, a product of Nippon Petrochemicals Co., Ltd.)
($PP_3$) Polypropylene (3) (MFR: 8 g/10 min, trade name: Nisseki Polypro J150G, a product of Nippon Petrochemicals Co., Ltd.)
($PP_5$) Polypropylene (5) (MFR: 1 g/10 min, trade name: Nisseki Polypro J620G, a product of Nippon Petrochemicals Co., Ltd.)
($HD_1$) High-density polyethylene (1) (MFR: 0.3 g/10 min, trade name: Nisseki Staflene E703, a product of Nippon Petrochemicals Co., Ltd.)
($ST_1$) Polystyrene (1) MFR: 0.4 g/10 min, trade name: Toporex 550, a product of Mitsui Toatsu Chemicals, Inc.)
($ST_2$) Polystyrene (2) (MFR: 1 g/10 min, trade name: Toporex 525, a product of Mitsui Toatsu Chemicals, Inc.)

COMPONENTS ($A_2$)

($PP_4$) Polypropylene (4) (MFR: 14 g/10 min, trade name: Nisseki Polypro J160G, a product of Nippon Petrochemicals Co., Ltd.)
($PP_6$) Polypropylene (6) (MFR: 4 g/10 min, trade name: Nisseki Polypro J630G, a product of Nippon Petrochemicals Co., Ltd.)
($PP_7$) Polypropylene (7) (MFR: 8 g/10 min, trade name: Nisseki Polypro J650G, a product of Nippon Petrochemicals Co., Ltd.)
($PP_8$) Polypropylene (8) (MFR: 20 g/10 min, trade name: Nisseki Polypro J871M, a product of Nippon Petrochemicals Co., Ltd.)
($PP_9$) Polypropylene (9) (MFR: 40 g/10 min, trade name: Nisseki Polypro J881M, a product of Nippon Petrochemicals Co., Ltd.)
(PP') Thermally Degraded Polypropylene 0.03 part by weight of Perhexa 25B (a product of Nippon Oil and Fats Co., Ltd.) as an organic peroxide was added to 100 parts by weight of polypropylene (MFR: 30 g/10 min, trade name: Nisseki Polypro J170G, a product of Nippon Petrochemicals Co., Ltd.), followed by melt-kneading using a single-screw extruder to obtain a degraded polypropylene having an MFR not smaller than 90 g/10 min.

($HD_2$) High-density polyethylene (2) MFR: 14 g/10 min, trade name Nisseki Staflene E792, a product of Nippon Petrochemicals Co., Ltd.)
($ST_3$) Polystyrene (3) (MFR: 4 g/10 min, trade name: Toporex, 500, a product of Mitsui Toatsu Chemicals, Inc.)

TABLE 1

| Constituent Compounds | | Symbol | Properties, etc. | Trade Name | Name of Mfg. Company |
|---|---|---|---|---|---|
| Unsaturated Elastomer | | | | | |
| Component (B) | Styrene-butadiene-styrene block copolymer (SBS) | $B_1$ | Styrene/Butadiene ratio = 28/72 | Carifrex TRKX-65 | Shell Kagaku K.K. |
| | | $B_2$ | Styrene/Butadiene ratio = 38/62 | Carifrex TR-1150 | Shell Kagaku K.K. |
| | Styrene-isoprene-styrene block polymer (SIS) | $B_3$ | Styrene/Isoprene ratio = 14/86 | Carifrex TR-1107 | Shell Kagaku K.K. |
| | Ethylene-propylene-ethylidene norbornene copolymer (EPDM) | $B_4$ | Mooney viscosity $ML_{1+4}$ (100° C.) 88, Iodine value 15 | JSR EP 57P | Japan Synthetic Rubber Co., Ltd. |
| | | $B_5$ | Mooney viscosity $ML_{1+4}$ (100° C.) 42, Iodine value 15 | JSR EP 22 | Japan Synthetic Rubber Co., Ltd. |
| | | $B_6$ | Mooney Viscosity $ML_{1+4}$ (100° C.) 47, Iodine value 6 | JSR EP 43 | Japan Synthetic Rubber Co., Ltd. |
| | 1,2-Polybutadiene rubber | $B_7$ | | JSR RB 805 | Japan Synthetic Rubber Co., Ltd. |
| | | $B_8$ | | JSR RB 820 | Japan Synthetic Rubber Co., Ltd. |
| | | $B_9$ | | JSR RB 840 | Japan Synthetic Rubber Co., Ltd. |

TABLE 1-continued

| Constituent Compounds | | Symbol | Properties, etc. | Trade Name | Name of Mfg. Company |
|---|---|---|---|---|---|
| Softener | Paraffinic process oil (mineral oil) | $C_1$ | | | Nippon Oil Co., Ltd. |
| | Liquid polybutene (synthetic oil) | $C_2$ | | Nisseki Polybutene LV100 | Nippon Petrochemicals Co., Ltd. |
| Crosslinking Agent | | | | | |
| Present Invention | | | | | |
| Component (a) | 9,10-Dihydrophenanthrene | $a_1$ | | | Tokyo Kasei Kogyo Co., Ltd. |
| | 6-Ethoxy-2,2,4-trimethyl-1,2-dihydroquinoline | $a_2$ | | Nocrac AW-D | Ouchi-shinko Chemical Industrial Co., Ltd. |
| | Poly(2,2,4-trimethyl-1,2-dihydroquinoline) | $a_3$ | | Nocrac 224-S | Ouchi-shinko Chemical Industrial Co., Ltd. |
| Others | N,N'-m-phenylenebismaleimide | $b_1$ | | Vulnoc PM | Ouchi-shinko Chemical Industrial Co., Ltd. |
| | Divinylbenzene | $b_2$ | | | Tokyo Kasei Kogyo Co., Ltd. |
| | Triallyl isocyanurate | $b_3$ | | TAIC | Nippon Kasei Chemical Co., Ltd. |
| Others | α,α'-Bis(t-butylperoxy)-m-diisopropylbenzene | $c_1$ | | Perbutyl P | Nippon Oil & Fats Co., Ltd. |
| | Phenolic resin | $c_2$ | Activator (stannous chloride 1 wt part, zinc flower 2 wt parts/PS 2608 4 wt parts) was used. | PS 2608 | Gun-ei Chemical Industry Co., Ltd. |

TABLE 2

| | Composition | | | | | | | | Conditions for Heat Treatment | |
|---|---|---|---|---|---|---|---|---|---|---|
| | Component (A) | | Component (B) | | Component (a) | | Other Crosslinking Agent | | | |
| | Kind | Amount (wt %) | Kind | Amount (wt %) | Kind | Amount* (wt parts) | Kind | Amount* (wt parts) | Temp. (°C.) | Time (sec) |
| Comp. Ex. 1 | A1 | 100 | — | — | — | — | — | — | — | — |
| Ex. 1 | A1 | 90 | B1 | 10 | a2 | 0.05 | b1 | 0.1 | 220 | 60 |
| Comp. Ex. 2 | A1 | 80 | B1 | 20 | — | — | — | — | — | — |
| Ex. 2 | A1 | 80 | B1 | 20 | a2 | 0.2 | — | — | 180 | 60 |
| Ex. 3 | A1 | 80 | B1 | 20 | a3 | 0.2 | — | — | 180 | 60 |
| Ex. 4 | A1 | 80 | B1 | 20 | a1 | 0.2 | — | — | 180 | 60 |
| Ex. 5 | A1 | 80 | B1 | 20 | a2 | 0.2 | b1 | 0.3 | 180 | 60 |
| Ex. 6 | A1 | 80 | B1 | 20 | a2 | 0.2 | b2 | 0.4 | 180 | 60 |
| Ex. 7 | A1 | 80 | B1 | 20 | a2 | 0.2 | b3 | 0.3 | 180 | 60 |
| Ex. 8 | A1 | 80 | B1 | 20 | a2 | 0.1 | b1 | 0.15 | 220 | 60 |
| Ex. 9 | A1 | 80 | B1 | 20 | a2 | 0.1 | b1 | 0.15 | 220 | 30 |
| Ex. 10 | A1 | 80 | B1 | 20 | a2 | 0.05 | b1 | 0.08 | 220 | 60 |
| Ex. 11 | A1 | 80 | B1 | 20 | a1 | 0.1 | b3 | 0.15 | 220 | 60 |

| | MFR (g/10 min) | Tensile Strength at Yield (kgf/cm$^2$) | Tensile Elongation at Break (%) | Flexural Modulus (kgf/cm$^2$) | Vicat Softening Temp. (°C.) | Izod Impact Strength (notched) (kgf/cm$^2$) | | | Boiling Xylene Insolubles (wt %) | Crystallization Temp. (°C.) |
|---|---|---|---|---|---|---|---|---|---|---|
| | | | | | | 23° C. | −10° C. | −30° C. | | |
| Comp. Ex. 1 | 1.8 | 270 | 300 | 13,200 | 147 | 18.3 | 6.6 | 6.0 | 0.7 | 112.8 |
| Ex. 1 | 1.9 | 240 | 320 | 10,800 | 141 | >66 | 50.2 | 10.1 | 10.8 | — |
| Comp. Ex. 2 | 1.5 | 220 | 200 | 9,900 | 135 | >66 | 45.0 | 10.5 | 0.8 | 112.9 |
| Ex. 2 | 1.0 | 210 | 310 | 9,200 | 137 | >66 | >66 | 16.2 | 16.1 | 115.1 |
| Ex. 3 | 1.1 | 210 | 230 | 9,500 | 136 | >66 | 58.1 | 12.1 | 15.2 | 114.0 |
| Ex. 4 | 1.0 | 210 | 300 | 9,300 | 136 | >66 | >66 | 14.5 | 13.9 | 115.5 |
| Ex. 5 | 0.6 | 210 | >300 | 9,100 | 137 | >66 | >66 | 26.1 | 18.9 | 116.9 |
| Ex. 6 | 0.7 | 210 | >300 | 9,100 | 137 | >66 | >66 | 23.2 | 16.9 | 116.9 |
| Ex. 7 | 0.6 | 205 | >300 | 9,100 | 136 | >66 | >66 | 22.0 | 16.8 | 116.2 |
| Ex. 8 | 0.7 | 200 | >300 | 9,100 | 139 | >66 | >66 | 31.8 | 21.2 | 117.7 |
| Ex. 9 | 0.7 | 210 | >300 | 9,100 | 137 | >66 | >66 | 20.8 | 19.2 | 117.1 |
| Ex. 10 | 0.8 | 210 | >300 | 9,200 | 138 | >66 | >66 | 14.9 | 19.2 | 117.1 |
| Ex. 11 | 0.7 | 200 | >300 | 9,000 | 137 | >66 | >66 | 21.2 | 18.9 | 116.8 |

*The total amount of components (A) and (B) is assumed to be 100 parts by weight.

TABLE 3

| | Composition | | | | | | | | Conditions for Heat Treatment | |
|---|---|---|---|---|---|---|---|---|---|---|
| | Component (A) | | Component (B) | | Component (a) | | Other Crosslinking Agent | | | |
| | Kind | Amount (wt %) | Kind | Amount (wt %) | Kind | Amount* (wt parts) | Kind | Amount* (wt parts) | Temp. (°C.) | Time (sec) |
| Comp. Ex. 3 | A1 | 80 | B3 | 20 | — | — | — | — | — | — |
| Ex. 12 | A1 | 80 | B3 | 20 | a2 | 0.2 | b1 | 0.3 | 180 | 60 |
| Comp. Ex. 4 | A1 | 80 | B4 | 20 | — | — | — | — | — | — |
| Ex. 13 | A1 | 80 | B4 | 20 | — | — | b1 | 0.3 | 220 | 60 |
| Ex. 14 | A1 | 80 | B4 | 20 | a2 | 0.2 | b1 | 0.3 | 220 | 60 |

TABLE 3-continued

| | | | | | | | | | | |
|---|---|---|---|---|---|---|---|---|---|---|
| Ex. 15 | A1 | 80 | B4 | 20 | a1 | 0.2 | b1 | 0.3 | 220 | 60 |
| Comp. Ex. 5 | A1 | 80 | B7 | 20 | — | — | — | — | — | — |
| Ex. 16 | A1 | 80 | B7 | 20 | a2 | 0.02 | b1 | 0.03 | 180 | 60 |

| | MFR (g/10 min) | Tensile Strength at Yield (kgf/cm$^2$) | Tensile Elongation at Break (%) | Flexural Modulus (kgf/cm$^2$) | Vicat Softening Temp. (°C.) | Izod Impact Strength (notched) (kgf/cm$^2$) | | | Boiling Xylene Insolubles (wt %) | Crystallization Temp. (°C.) |
|---|---|---|---|---|---|---|---|---|---|---|
| | | | | | | 23° C. | −10° C. | −30° C. | | |
| Comp. Ex. 3 | 2.6 | 200 | >300 | 9,700 | 134 | >66 | 37.3 | 11.6 | 0.9 | — |
| Ex. 12 | 1.3 | 195 | >300 | 9,500 | 140 | >66 | 66 | 21.9 | 8.4 | — |
| Comp Ex. 4 | 1.4 | 200 | >300 | 9,900 | 134 | >66 | 60.0 | 13.0 | 0.9 | 113.0 |
| Ex. 13 | 2.2 | 190 | >300 | 9,500 | 137 | >66 | 66 | 22.1 | 9.6 | — |
| Ex. 14 | 2.2 | 180 | >300 | 9,200 | 140 | >66 | 66 | 55.0 | 20.8 | 122.8 |
| Ex. 15 | 1.7 | 190 | >300 | 9,200 | 138 | >66 | 66 | 47.0 | 18.1 | 120.0 |
| Comp. Ex. 5 | 5.0 | 50 | 50 | 9,000 | 128 | >66 | 10.5 | 5.5 | 0.9 | — |
| Ex. 16 | 0.9 | 180 | >300 | 9,200 | 134 | >66 | 30.3 | 9.5 | 21.0 | — |

*The total amount of components (A) and (B) is assumed to be 100 parts by weight.

TABLE 4

| | Composition | | | | | | | | Conditions for Heat Treatment | |
|---|---|---|---|---|---|---|---|---|---|---|
| | Component (A) | | Component (B) | | Component (a) | | Other Crosslinking Agent | | | |
| | Kind | Amount (wt %) | Kind | Amount (wt %) | Kind | Amount* (wt parts) | Kind | Amount* (wt parts) | Temp. (°C.) | Time (sec) |
| Comp. Ex. 6 | A2 | 100 | — | — | — | — | — | — | — | — |
| Comp. Ex. 7 | A2 | 80 | B1 | 20 | — | — | — | — | — | — |
| Ex. 17 | A2 | 80 | B1 | 20 | a2 | 0.2 | b1 | 0.3 | 180 | 60 |
| Comp. Ex. 8 | A2 | 80 | B4 | 20 | — | — | — | — | — | — |
| Ex. 18 | A2 | 80 | B4 | 20 | a2 | 0.2 | b2 | 0.4 | 220 | 60 |
| Ex. 19 | A2 | 80 | B4 | 20 | a2 | 0.2 | b1 | 0.3 | 220 | 60 |
| Comp. Ex. 9 | A2 | 65 | B4 | 35 | — | — | — | — | — | — |
| Ex. 20 | A2 | 65 | B4 | 35 | a2 | 0.3 | b1 | 0.5 | 220 | 60 |
| Comp. Ex. 10 | A3 | 100 | — | — | — | — | — | — | — | — |
| Comp. Ex. 11 | A3 | 80 | B1 | 20 | — | — | — | — | — | — |
| Ex. 21 | A3 | 80 | B1 | 20 | a2 | 0.2 | b1 | 0.3 | 180 | 60 |
| Comp. Ex. 12 | A3 | 80 | B2 | 20 | — | — | — | — | — | — |
| Ex. 22 | A3 | 80 | B2 | 20 | a2 | 0.2 | b1 | 0.3 | 180 | 60 |
| Comp. Ex. 13 | A3 | 80 | B4 | 20 | — | — | — | — | — | — |
| Ex. 23 | A3 | 80 | B4 | 20 | a2 | 0.2 | b1 | 0.3 | 220 | 60 |
| Comp. Ex. 14 | A3 | 80 | B5 | 20 | — | — | — | — | — | — |
| Ex. 24 | A3 | 80 | 85 | 20 | a2 | 0.1 | b1 | 0.1 | 220 | 60 |
| Comp. Ex. 15 | A4 | 100 | — | — | — | — | — | — | — | — |
| Comp. Ex. 16 | A4 | 80 | B4 | 20 | — | — | — | — | — | — |
| Ex. 25 | A4 | 80 | B4 | 20 | a2 | 0.2 | b2 | 0.4 | 220 | 120 |
| Comp. Ex. 17 | A5 | 100 | — | — | — | — | — | — | — | — |
| Comp. Ex. 18 | A5 | 80 | B4 | 20 | — | — | — | — | — | — |
| Ex. 26 | A5 | 80 | B4 | 20 | a2 | 0.2 | b1 | 0.3 | 190 | 75 |
| Comp. Ex. 19 | A6 | 100 | — | — | — | — | — | — | — | — |
| Comp. Ex. 20 | A6 | 80 | B1 | 120 | — | — | — | — | — | — |
| Ex. 27 | A6 | 80 | B1 | 20 | a2 | 0.2 | b1 | 0.3 | 190 | 60 |
| Comp. Ex. 21 | A7 | 100 | — | — | — | — | — | — | — | — |
| Comp. Ex. 22 | A7 | 80 | B4 | 20 | — | — | — | — | — | — |
| Ex. 28 | A7 | 80 | B4 | 20 | a1 | 0.3 | b1 | 0.3 | 260 | 60 |
| Comp. Ex. 23 | A8 | 100 | — | — | — | — | — | — | — | — |
| Comp. Ex. 24 | A8 | 80 | B4 | 20 | — | — | — | — | — | — |
| Ex. 29 | A8 | 80 | B4 | 20 | a1 | 0.3 | b1 | 0.3 | 260 | 60 |

| | MFR (g/10 min) | Tensile Strength at Yield (kgf/cm$^2$) | Tensile Elongation at Break (%) | Flexural Modulus (kgf/cm$^2$) | Vicat Softening Temp. (°C.) | Izod Impact Strength (notched) (kgf/cm$^2$) | | | Boiling Xylene Insolubles (wt %) | Crystallization Temp. (°C.) |
|---|---|---|---|---|---|---|---|---|---|---|
| | | | | | | 23° C. | −10° C. | −30° C. | | |
| Comp. Ex. 6 | 1.7 | 355 | 210 | 16,800 | 154 | 8.2 | 3.6 | 3.3 | 0.4 | 114.7 |
| Comp. Ex. 7 | 1.2 | 255 | 220 | 12,600 | 141 | 23.2 | 6.6 | 6.2 | 0.8 | 111.9 |
| Ex. 17 | 0.7 | 240 | >300 | 11,300 | 143 | 58.9 | 14.0 | 9.0 | 18.9 | 119.1 |
| Comp. Ex. 8 | 1.6 | 245 | 220 | 12,500 | 143 | 25.3 | 6.5 | 6.2 | 0.8 | 112.6 |
| Ex. 18 | 2.8 | 235 | >300 | 11,100 | 145 | 59.2 | 8.2 | 7.4 | 21.8 | 116.9 |
| Ex. 19 | 2.4 | 230 | >300 | 12,000 | 148 | 63.8 | 15.8 | 10.7 | 18.0 | 124.4 |
| Comp. Ex. 9 | 0.9 | 195 | >300 | 9,200 | 131 | >66 | 15.0 | 10.8 | 1.2 | — |
| Ex. 20 | 0.9 | 180 | >300 | 8,900 | 135 | >66 | >66 | >66 | 36.2 | — |
| Comp. Ex. 10 | 20.7 | 280 | 50 | 16,000 | 149 | 10.1 | 5.6 | 5.2 | 1.3 | — |
| Comp. Ex. 11 | 11.6 | 190 | 120 | 12,100 | 132 | 28.1 | 8.0 | 7.0 | 1.6 | — |
| Ex. 21 | 6.0 | 185 | 200 | 11,000 | 137 | 40.7 | 13.2 | 9.1 | 19.6 | — |
| Comp. Ex. 12 | 13.5 | 210 | 90 | 12,000 | 134 | 23.3 | 7.3 | 6.3 | 1.6 | — |
| Ex. 22 | 6.3 | 210 | 110 | 11,900 | 138 | 29.3 | 9.9 | 8.1 | 21.9 | — |
| Comp. Ex. 13 | 11.0 | 180 | 70 | 10,800 | 135 | 18.0 | 9.0 | 8.2 | 1.8 | — |
| Ex. 23 | 5.0 | 190 | 190 | 10,000 | 140 | 61.6 | 13.2 | 11.3 | 20.8 | — |
| Comp. Ex. 14 | 13.0 | 180 | 60 | 10,500 | 132 | 18.0 | 9.2 | 8.0 | 0.9 | — |

TABLE 4-continued

| | | | | | | | | | | |
|---|---|---|---|---|---|---|---|---|---|---|
| Ex. 24 | 10.1 | 180 | 190 | 10,500 | 140 | >66 | 20.8 | 12.0 | 20.8 | — |
| Comp. Ex. 15 | 8.2 | 280 | 110 | 14,200 | 149 | 12.2 | 5.3 | 5.1 | 1.6 | 111.5 |
| Comp. Ex. 16 | 4.5 | 210 | 150 | 10,200 | 135 | >66 | 11.2 | 10.3 | 1.6 | 113.0 |
| Ex. 25 | 5.5 | 190 | >300 | 10,200 | 138 | >66 | 21.6 | 16.1 | 4.0 | 119.2 |
| Comp. Ex. 17 | — | — | — | 13,000 | — | — | — | 4.5 | 0.8 | — |
| Comp. Ex. 18 | — | — | — | 9,100 | — | — | — | 20.1 | 1.3 | — |
| Ex. 26 | — | — | — | 9,000 | — | — | — | 51.3 | 21.6 | — |
| Comp. Ex. 19 | — | — | — | 29,500 | — | — | — | 2.0 | 1.0 | — |
| Comp. Ex. 20 | — | — | — | 21,000 | — | — | — | 5.0 | 1.7 | — |
| Ex. 27 | — | — | — | 20,700 | — | — | — | 21.1 | 21.1 | — |
| Comp. Ex. 21 | — | 720 | 220 | 26,100 | — | 4.5 | — | — | 98.8 | — |
| Comp. Ex. 22 | — | 400 | 30 | 22,000 | — | 5.9 | — | — | 80.8 | — |
| Ex. 28 | — | 420 | 180 | 22,300 | — | 36.9 | — | — | 96.6 | — |
| Comp. Ex. 23 | — | 530 | 250 | 24,300 | — | 6.0 | — | — | 98.5 | — |
| Comp. Ex. 24 | — | 320 | 130 | 15,600 | — | 20.8 | — | — | 79.9 | — |
| Ex. 29 | — | 310 | 280 | 15,000 | — | 33.0 | — | — | 94.8 | — |

*The total amount of components (A) and (B) is assumed to be 100 parts by weight.

TABLE 5

| | Composition | | | | | | | | | | | Conditions for Heat Treatment | |
|---|---|---|---|---|---|---|---|---|---|---|---|---|---|
| | Component (A) | | Component (B) | | Softening Agent | | Component (a) | | Other Cross-linking Agent | | | | |
| | Kind | Amount (wt parts) | Kind | Amount (wt parts) | Kind | Amount* (wt parts) | Kind | Amount* (wt parts) | Kind | Amount* (wt parts) | Temp. (°C.) | Time (sec) |
| Comp. Ex. 25 | A1 | 70 | B4 | 30 | — | — | — | — | — | — | — | — |
| Ex. 30 | A1 | 70 | B4 | 30 | — | — | a2 | 0.3 | b1 | 0.4 | 220 | 70 |
| Ex. 31 | A1 | 70 | B4 | 30 | C1 | 20 | a2 | 0.3 | b1 | 0.4 | 220 | 70 |
| Comp. Ex. 26 | A1 | 70 | B4 | 30 | — | — | c1 | 0.1 | — | — | 220 | 70 |
| Comp. Ex. 27 | A1 | 70 | B4 | 30 | — | — | c1 | 0.3 | b2 | 0.3 | 220 | 70 |
| Comp. Ex. 28 | A1 | 70 | B1 | 30 | — | — | — | — | — | — | — | — |
| Ex. 32 | A1 | 70 | B1 | 30 | — | — | a2 | 0.3 | — | — | 180 | 75 |
| Ex. 33 | A1 | 70 | B1 | 30 | — | — | a2 | 0.3 | b2 | 0.4 | 180 | 75 |
| Comp. Ex. 29 | A1 | 70 | B3 | 30 | — | — | — | — | — | — | — | — |
| Ex. 34 | A1 | 70 | B3 | 30 | — | — | a2 | 0.3 | b1 | 0.4 | 180 | 0 |
| Comp. Ex. 30 | A1 | 90 | B9 | 10 | — | — | — | — | — | — | — | — |
| Ex. 35 | A1 | 90 | B9 | 10 | — | — | a1 | 0.01 | b1 | 0.01 | 180 | 60 |
| Comp. Ex. 31 | A1 | 70 | B8 | 30 | — | — | — | — | — | — | — | — |
| Ex. 36 | A1 | 70 | B8 | 30 | — | — | a2 | 0.03 | b1 | 0.04 | 180 | 60 |
| Ex. 37 | A1 | 70 | B8 | 30 | C2 | 20 | a2 | 0.03 | b1 | 0.04 | 180 | 60 |

| | High-load MFR (g/10 min) | Tensile Strength at Yield (kgf/cm²) | Tensile Elongation at Break (%) | Flexural Modulus (kgf/cm²) | Durometer Hardness (H_DA) | Parameter Elongation (%) | Vicat Softening Temp. (250 g) (°C.) | Brittle Temp. (°C.) | Boiling Xylene Insolubles (wt %) | Abrasion Resistance (mg/1000 times) |
|---|---|---|---|---|---|---|---|---|---|---|
| Comp. Ex. 25 | 18 | 50 | >300 | 700 | 78 | 35 | 61 | <−70 | 1.8 | — |
| Ex. 30 | 3 | 150 | >300 | 840 | 92 | 18 | 91 | <−70 | 31.1 | — |
| Ex. 31 | 8 | 142 | >300 | 590 | 84 | 18 | 82 | <−70 | 26.1 | — |
| Comp. Ex. 26 | 1 | 80 | 100 | 800 | 89 | 20 | 75 | <−70 | 42.1 | — |
| Comp. Ex. 27 | | | | (extrusion was impossible) | | | | | | |
| Comp. Ex. 28 | 10 | 60 | >300 | 920 | 83 | 38 | 58 | <−70 | 1.5 | — |
| Ex. 32 | 5 | 91 | >300 | 950 | 85 | 18 | 79 | <−70 | 20.1 | — |
| Ex. 33 | 2 | 115 | >300 | 950 | 88 | 17 | 88 | <−70 | 31.1 | — |
| Comp. Ex. 29 | 16 | 50 | >300 | 700 | 71 | 35 | 58 | <−70 | 0.8 | — |
| Ex. 34 | 10 | 80 | >300 | 700 | 75 | 28 | 67 | <−70 | 9.9 | — |
| Comp. Ex. 30 | — | 150 | >300 | 1,050 | 96 | 35 | 100 | — | 1.1 | 19 |
| Ex. 35 | 21 | 160 | >300 | 1,150 | >98 | 30 | 110 | — | 10.9 | 9 |
| Comp. Ex. 31 | — | 105 | >300 | 650 | 84 | 25 | 81 | — | 0.9 | 25 |
| Ex. 36 | 8 | 110 | >300 | 700 | 88 | 21 | 101 | — | 30.0 | 10 |
| Ex. 37 | 36 | 110 | >300 | 700 | 84 | 18 | 90 | — | 24.7 | 10 |

*The total amount of component (A) and (B) is assumed to be 100 parts by weight.

TABLE 6

| | Composition | | | | | | | | | | Conditions for Heat Treatment | |
|---|---|---|---|---|---|---|---|---|---|---|---|---|
| | Component (A) | | Component (B) | | Softening Agent | | Component (a) | | Other Cross-linking agent | | | |
| | Kind | Amount (wt %) | Kind | Amount (wt %) | Kind | Amount* (wt parts) | Kind | Amount* (wt parts) | Kind | Amount* (wt parts) | Temp. (°C.) | Time (sec) |
| Ex. 38 | A1 | 55 | B4 | 45 | C1 | 20 | a2 | 0.5 | b1 | 0.8 | 220 | 80 |
| Ex. 39 | A1 | 55 | B4 | 45 | C1 | 20 | a1 | 0.4 | b1 | 0.6 | 220 | 70 |
| Ex. 40 | A1 | 55 | B4 | 45 | C1 | 20 | a3 | 0.3 | b1 | 0.5 | 220 | 70 |
| Comp. Ex. 32 | A1 | 55 | B4 | 45 | C1 | 20 | c1 | 0.3 | b2 | 0.3 | 220 | 90 |
| Comp. Ex. 33 | A1 | 55 | B4 | 45 | C1 | 20 | c2 | 7** | — | — | 220 | 90 |
| Comp. Ex. 34 | A1 | 45 | B4 | 55 | C1 | 20 | c1 | 0.3 | b2 | 0.3 | 220 | 90 |
| Ex. 41 | A1 | 42 | B4 | 58 | C1 | 40 | a2 | 0.6 | b1 | 0.9 | 220 | 70 |
| Comp. Ex. 35 | A1 | 30 | B4 | 70 | C1 | 30 | c1 | 0.3 | b2 | 0.3 | 220 | 90 |
| Ex. 42 | A1 | 55 | B4 | 45 | C2 | 20 | a2 | 0.5 | b1 | 0.8 | 220 | 80 |

TABLE 6-continued

| | | | | | | | | | | | | |
|---|---|---|---|---|---|---|---|---|---|---|---|---|
| Ex. 43 | A1 | 55 | B1 | 45 | C1 | 20 | a2 | 0.6 | — | — | 220 | 60 |
| Ex. 44 | A1 | 55 | B1 | 45 | C1 | 40 | a2 | 0.5 | b2 | 0.8 | 220 | 70 |
| Ex. 45 | A1 | 55 | B9 | 45 | C1 | 20 | a2 | 0.05 | b1 | 0.10 | 180 | 50 |
| Ex. 46 | A3 | 55 | B4 | 45 | C1 | 20 | a2 | 0.4 | b1 | 0.6 | 220 | 60 |
| Comp. Ex. 36 | A3 | 55 | B4 | 45 | C1 | 20 | c1 | 0.3 | b2 | 0.3 | 220 | 90 |
| Ex. 47 | A3 | 55 | B1 | 45 | C1 | 20 | a2 | 0.4 | b1 | 0.8 | 220 | 60 |
| Ex. 48 | A5 | 55 | B4 | 45 | C1 | 10 | a2 | 0.3 | b1 | 0.5 | 220 | 70 |
| Comp. Ex. 37 | A5 | 55 | B4 | 45 | C1 | 10 | c1 | 0.1 | b2 | 0.1 | 220 | 70 |
| Ex. 49 | A5 | 55 | B9 | 45 | — | — | a2 | 0.03 | b1 | 0.05 | 180 | 60 |
| Ex. 50 | { A5 / A2 | 45 / 10 | B1 | 45 | — | — | a1 | 0.3 | b2 | 0.6 | 180 | 60 |
| Ex. 51 | { A5 / A4 | 45 / 10 | B3 | 45 | — | — | a2 | 0.3 | b1 | 0.5 | 180 | 60 |

| | Properties of Composition | | | | | | | | | |
|---|---|---|---|---|---|---|---|---|---|---|
| | Durometer Hardness (H$_D$A) | High-load MFR (g/10 min) | Tensile Strength at Yield (kgf/cm$^2$) | Vicat Softening Temp. (250 g) (°C.) | Brittle Temp. (°C.) | Boiling Xylene Insolubles (wt %) | Oil Resistance [70° C., 22 hr] (%/%) No. 1 Oil | Oil Resistance No. 2 Oil | Appearance Glossiness | Appearance Flow Mark | Parison Roughness |
| Ex. 38 | 92 | 18 | 120 | 151 | <−75 | 38.2 | 2/2 | 13/24 | 35 | ⊚ | ⊚ |
| Ex. 39 | 88 | 30 | 95 | 148 | <−75 | 30.1 | — | — | 39 | ⊚ | ⊚ |
| Ex. 40 | 91 | 30 | 100 | 150 | <−75 | 35.7 | — | — | 39 | ⊚ | ⊚ |
| Comp. Ex. 32 | 90 | 50 | 90 | 139 | −60 | 34.8 | 6/7 | 24/45 | 18 | c | x |
| Comp. Ex. 33 | 91 | <1 | 70 | 150 | −50 | 39.1 | 1/2 | 8/12 | 10 | x | ⊚ |
| Comp. Ex. 34 | 80 | 8 | 65 | 128 | <−75 | 39.0 | — | — | 9 | x | x |
| Ex. 41 | 71 | 7 | 58 | 140 | <−75 | 42.2 | 5/5 | 21/39 | 32 | ⊚ | ⊚ |
| Comp. Ex. 35 | 70 | 6 | 50 | 125 | <−75 | 48.9 | 25/26 | 71/130 | 9 | x | x |
| Ex. 42 | 91 | 14 | 115 | 150 | <−75 | 39.0 | — | — | 47 | ⊚ | ⊚ |
| Ex. 43 | 80 | 18 | 90 | 110 | −60 | 34.0 | — | — | 39 | ⊚ | ⊚ |
| Ex. 44 | 80 | 30 | 86 | 148 | <−75 | 32.0 | — | — | 32 | ⊚ | o |
| Ex. 45 | 96 | 30 | 135 | 150 | −60 | 37.0 | — | — | 35 | ⊚ | ⊚ |
| Ex. 46 | 82 | 5 | 80 | 120 | <−70 | 36.9 | — | — | — | ⊚ | ⊚ |
| Comp. Ex. 36 | (extrusion was impossible) | | | | | | | | | | |
| Ex. 47 | 88 | 5 | 88 | 103 | −55 | 38.0 | — | — | — | ⊚ | ⊚ |
| Ex. 48 | 82 | 10 | 98 | 91 | <−75 | 40.5 | 18/19 | 39/42 | 30 | c | ⊚ |
| Comp. Ex. 37 | 80 | 1 | 75 | 80 | <−75 | 30.1 | 30/33 | 95/101 | 8 | x | x |
| Ex. 49 | 97 | 5 | 180 | 110 | <−75 | 44.0 | — | — | 40 | ⊚ | ⊚ |
| Ex. 50 | 90 | 4 | 90 | 85 | −65 | 45.1 | — | — | 30 | ⊚ | ⊚ |
| Ex. 51 | 80 | 4 | 91 | 81 | −65 | 38.1 | — | — | 21 | c | ⊚ |

*The total amount of components (A) and (B) is assumed to be 100 parts by weight.
**Containing an active agent

TABLE 7

| | Composition | | | | | | | | | | | Conditions for Heat Treatment | |
|---|---|---|---|---|---|---|---|---|---|---|---|---|---|
| | Component (A) Polypropylene | | Component (A) VLDPE | | Component (B) | | Softening Agent | | Component (a) | | Other Crosslinking Agent | | |
| | Kind | Amount (wt %) | Kind | Amount (wt %) | Kind | Amount (wt %) | Kind | Amount* (wt parts) | Kind | Amount* (wt parts) | Kind | Amount* (wt parts) | Temp. (°C.) | Time (sec) |
| Ex. 52 | A1 | 67 | — | — | B4 | 33 | C1 | 20 | a3 | 0.45 | b1 | 0.50 | 240 | 60 |
| Comp. Ex. 38 | A1 | 67 | — | — | B4 | 33 | C1 | 20 | — | — | { b2 / b1 | 0.30 / 0.30 | 240 | 60 |
| Ex. 53 | A2 | 65 | A4 | 10 | B4 | 25 | C1 | 10 | a3 | 0.25 | b1 | 0.30 | 240 | 60 |
| Ex. 54 | A2 | 57 | A4 | 10 | B4 | 33 | C1 | 20 | a3 | 0.40 | b1 | 0.45 | 240 | 60 |
| Ex. 55 | A3 | 67 | — | — | B6 | 33 | C1 | 20 | a3 | 0.45 | b1 | 0.50 | 240 | 60 |
| Ex. 56 | A3 | 67 | — | — | B5 | 33 | C1 | 20 | a3 | 0.45 | b1 | 0.50 | 240 | 60 |
| Ex. 57 | A3 | 55 | A5 | 15 | B5 | 30 | C1 | 20 | a3 | 0.30 | b1 | 0.35 | 240 | 60 |
| Ex. 58 | A3 | 67 | — | — | B4 | 33 | C1 | 20 | a3 | 0.45 | b1 | 0.50 | 240 | 60 |
| Comp. Ex. 39 | A3 | 67 | — | — | B4 | 33 | C1 | 20 | — | — | { b2 / c1 | 0.30 / 0.30 | 240 | 60 |
| Ex. 59 | A3 | 40 | A5 | 30 | B4 | 30 | C1 | 20 | a3 | 0.30 | b1 | 0.35 | 240 | 60 |

| | Properties of Composition | | | | | | | | | | |
|---|---|---|---|---|---|---|---|---|---|---|---|
| | Spiral Flow (mm) | Tensile Strength at Yield (kgf/cm) | Tensile Elongation at Break (%) | Flexural Strength (kgf/cm) | Flexural Modulus (kgf/cm) | Durometer Hardness (H$_D$D) [H$_D$A] | Permanent Elongation (%) | Vicat Softening Temp. (250 g) (°C.) | Izod Impact Strength (notched) (kgf/cm) −30° C. | Izod Impact Strength −40° C. | Boiling Xylene Insolubles (wt %) | Parison Roughness, Elongation |
| Ex. 52 | — | 206 | 450 | 127 | 4,400 | 51 | 51 | 118 | >66 | 15.8 | 26.3 | c |
| Comp. Ex. 38 | — | 155 | 450 | 80 | 2,500 | 50 | 42 | 93 | >66 | 12.2 | 22.0 | x |
| Ex. 53 | — | 194 | 480 | 118 | 4,200 | 52 | 45 | 112 | >66 | >66 | 24.2 | ⊚ |

TABLE 7-continued

| | | | | | | | | | | | |
|---|---|---|---|---|---|---|---|---|---|---|---|
| Ex. 54 | — | 155 | 480 | 72 | 2,370 | 46 | 38 | 91 | >66 | >66 | 28.7 | ⊙ |
| Ex. 55 | 760 | 120 | 550 | 88 | 2,950 | 45 | 47 | 92 | >66 | >66 | 26.1 | — |
| Ex. 56 | 880 | 120 | 550 | 88 | 2,800 | 45 | 44 | 92 | >66 | >66 | 27.5 | — |
| Ex. 57 | 810 | 132 | 550 | 88 | 3,050 | 48 | 48 | 91 | >66 | >66 | 23.1 | — |
| Ex. 58 | 660 | 135 | 550 | 95 | 3,300 | 47 | 48 | 102 | >66 | 28.9 | 26.8 | — |
| Comp. Ex. 39 | 620 | 100 | 400 | 70 | 2,450 | 44 | 49 | 83 | 25.8 | 9.8 | 21.0 | — |
| Ex. 59 | 552 | 109 | 540 | 45 | 1,520 | [95] | 33 | [120] | >66 | >66 | 24.7 | — |

*The total amount of components (A) and (B) is assumed to be 100 parts by weight.

TABLE 8

Composition

| | Component (A1) | | Component (B) | | Component (A2) | | Component (a) | | Other Cross-linking Agent | |
|---|---|---|---|---|---|---|---|---|---|---|
| | Kind | Amount (wt %) | Kind | Amount (wt %) | Kind | Amount (wt %) | Kind | Amount** (wt parts) | Kind | Amount** (wt parts) |
| Ex. 60 | PP5 | 24.5 | B4 | 20(45)* | PP9 | 55.5 | a2 | 0.2 | b1 | 0.3 |
| Ex. 61 | PP5 | 24.5 | B4 | 20(45) | PP9 | 55.5 | a1 | 0.2 | b1 | 0.3 |
| Ex. 62 | PP5 | 24.5 | B4 | 20(45) | PP9 | 55.5 | a2 | 0.2 | b2 | 0.4 |
| Ex. 63 | PP5 | 24.5 | B8 | 20(45) | PP8 | 55.5 | a3 | 0.02 | b1 | 0.03 |
| Ex. 64 | PP5 | 24.5 | B1 | 20(45) | PP7 | 55.5 | a2 | 0.2 | — | — |
| Comp. Ex. 40 | PP5 | 24.5 | B1 | 20(45) | PP6 | 55.5 | a2 | 0.2 | — | — |
| Comp. Ex. 41 | PP5 | 24.5 | B1 | 20(45) | PP' | 55.5 | a2 | 0.2 | — | — |
| Comp. Ex. 42 | PP5 | 64 | B1 | 20(24) | PP3 | 16 | a2 | 0.2 | — | — |
| Comp. Ex. 43 | PP5 | 80 | B1 | 20(20) | — | — | a2 | 0.2 | — | — |
| Ex. 65 | PP1 | 24.5 | B4 | 20(45) | PP4 | 55.5 | a2 | 0.2 | b1 | 0.3 |
| Comp. Ex. 44 | PP1 | 24.5 | B4 | 20(45) | PP4 | 55.5 | a2 | 0.2 | b1 | 0.3 |
| Comp. Ex. 45 | PP2 | 80 | B4 | 20(20) | — | — | — | — | — | — |
| Comp. Ex. 46 | PP8 | 80 | B4 | 20(20) | — | — | — | — | — | — |
| Comp. Ex. 47 | PP3 | 80 | B4 | 20(20) | — | — | a2 | 0.2 | b1 | 0.3 |
| Comp. Ex. 48 | PP8 | 80 | B4 | 20(20) | — | — | a2 | 0.2 | b1 | 0.3 |
| Ex. 66 | HD1 | 24.5 | B4 | 20(45) | HD2 | 55.5 | a2 | 0.2 | b1 | 0.3 |
| Comp. Ex. 49 | HD1 | 24.5 | B4 | 20(45) | HD2 | 55.5 | a2 | 0.2 | b1 | 0.3 |
| Comp. Ex. 50 | HD1 | 10 | B4 | 20(67) | HD2 | 70 | a2 | 0.2 | b1 | 0.3 |
| Ex. 67 | ST1 | 24.5 | B3 | 20(45) | ST3 | 55.5 | a2 | 0.2 | b1 | 0.3 |
| Comp. Ex. 51 | ST1 | 24.5 | B3 | 20(45) | ST3 | 55.5 | a2 | 0.2 | b1 | 0.3 |
| Comp. Ex. 52 | St2 | 80 | B3 | 20(20) | — | — | a2 | 0.2 | b1 | 0.3 |

| | (A1)/(A2) Ratio | | Preparation Process | Conditions for Heat Treatment | | Properties of Composition | | | | |
|---|---|---|---|---|---|---|---|---|---|---|
| | | (—) | Process (No. 1 or No. 2) | Temp. (°C.) | Time (sec) | MFR (g/10 min) | Glossiness (%) | Izod Impact Strength (kgf/cm²) | | Boiling Xylene Insolubles (wt %) |
| | MFR | Weight | | | | | | −10° C. | −30° C. | |
| Ex. 60 | 40 | 2.27 | No. 1 | 220 | 60 | 12.0 | 90 | 18.0 | 15.1 | 19.9 |
| Ex. 61 | 40 | 2.27 | No. 1 | 220 | 60 | 13.1 | 90 | 15.0 | 13.1 | 16.4 |
| Ex. 62 | 40 | 2.27 | No. 1 | 220 | 60 | 15.0 | 91 | 16.1 | 12.2 | 3.2 |
| Ex. 63 | 20 | 2.27 | No. 1 | 180 | 60 | 10.0 | 91 | 18.0 | 12.2 | 20.0 |
| Ex. 64 | 8 | 2.27 | No. 1 | 180 | 60 | 3.0 | 88 | >66 | 18.8 | 16.5 |
| Comp. Ex. 40 | 4 | 2.27 | No. 1 | 180 | 60 | 1.8 | 86 | >66 | 18.6 | 16.1 |
| Comp. Ex. 41 | >90 | 2.27 | No. 1 | 180 | 60 | 60.0 | 89 | 3.6 | 3.1 | 16.1 |
| Comp. Ex. 42 | 20 | 0.25 | No. 1 | 180 | 60 | 1.1 | 85 | >66 | 16.1 | 16.5 |
| Comp. Ex. 43 | — | 0 | — | 180 | 60 | 1.0 | 83 | >6.6 | 18.8 | 16.1 |
| Ex. 65 | 14 | 2.27 | No. 1 | 220 | 60 | 5.0 | 88 | 13.1 | 9.3 | 20.8 |
| Comp. Ex. 44 | 14 | 2.27 | No. 2 | 220 | 60 | 3.6 | 79 | 8.8 | 3.6 | 19.8 |
| Comp. Ex. 45 | — | 0 | — | — | — | 3.5 | 83 | 3.0 | 2.8 | 0.4 |
| Comp. Ex. 46 | — | 0 | — | — | — | 11.0 | 87 | 9.0 | 8.2 | 1.8 |
| Comp. Ex. 47 | — | 0 | — | 220 | 60 | 3.6 | 80 | 10.0 | 3.9 | 19.1 |
| Comp. Ex. 48 | — | 0 | — | 220 | 60 | 5.0 | 85 | 13.2 | 11.3 | 20.8 |
| Ex. 66 | 47 | 2.27 | No. 1 | 190 | 75 | 5.0 | — | 34.2 | — | 20.9 |
| Comp. Ex. 49 | 47 | 2.27 | No. 2 | 190 | 75 | 2.3 | — | 10.5 | — | 20.1 |
| Comp. Ex. 50 | 47 | 7 | No. 2 | 190 | 75 | 2.3 | — | 6.1 | — | 19.9 |
| Ex. 67 | 10 | 2.27 | No. 1 | 180 | 60 | 2.1 | — | 18.0 | — | 10.1 |
| Comp. Ex. 51 | 10 | 2.27 | No. 2 | 180 | 60 | 0.9 | — | 9.8 | — | 10.1 |
| Comp. Ex. 52 | — | 0 | — | 180 | 60 | 0.9 | — | 19.6 | — | 9.3 |

*( ) weight parts in the case that the total amount of components (A1) and (B) is assumed to be 100 parts by weight.
**The total amount of components (A1) and (B) is assumed to be 100 parts by weight.

What is claimed is:

1. A process for preparing a thermoplastic resin composition by heat-treating a mixture comprising (a) a thermoplastic resin substantially containing no olefinic unsaturated carbon-carbon bond, said thermoplastic resins, ethylene-unsaturated carboxylate copolymers, polystyrene resins, polyacrylonitrile resins, polymethacrylate resins, polyamide resins, polyester resins, polyacetal resins and mixtures thereof and (B) an elastomer having an olefinic unsaturated carbon-carbon bond, dynamically in the presence of a crosslinking agent, characterized in that as said elastomer (B) there is used at least one member selected from the group consisting of styrene-butadiene-styrene block copolymer (SBS), and styrene-isoprene-styrene block copolymer (SIS), and that said crosslinking agent consists essentially of a dihydroaromatic compound or a polymer thereof.

2. A process of claim 1, wherein said crosslinking agent consists essentially of a 1,2-dihydroquinoline compound or a polymer thereof and a bismaleimide compound.

3. A process of claim 1, wherein the component (A) is a polyolefin resin or a polystyrene resin.

4. A process of claim 3, wherein the polyolefin resin is polypropylene, a high-density polyethylene or an ultra-low-density polyethylene having a density not higher than 0.910 g/cm³ (ULDPE).

5. Process of claim 4, wherein the ULDPE is a ethylene-α-olefin copolymer having the following properties (i)–(iii).

6. A process of claim 1, wherein the component (A) is a crystalline polypropylene resin and or ULDPE.

7. A process of claim 6, wherein the ULDPE is an ethylene-α-olefin having the following properties (i)–(iii):

| (i) | Density | 0.860–0.910 g/cm³ |
| (ii) | Maximum peak temperature as measured according to a difference scanning calorimetry (DSC) | Not lower than 100° C. |
| (iii) | Insolubles in boiling n-hexane | Not lower than 10 wt %. |

8. A process of claim 1, wherein in addition to said components there is used a mineral oil softener or a synthetic oil softener in an amount not larger than 300 parts by weight per 100 parts by weight of the component (B).

9. A process of claim 1, wherein as the thermoplastic resin component (A) there are selected a first and second resin, ($A_1$) and ($A_2$), respectively, having the following relation, then the components ($A_1$) and (B) are melt-blended in a ratio satisfying the following relation, then the component ($A_2$) is incorporated in the resulting mixture, followed by dynamic heat treatment in the presence of the crosslinking agent:

MFR of ($A_2$)/MFR of ($A_1$) = 5–80

Weight of ($A_2$)/weight of ($A_1$) ≧ 0.3

Weight of (B)/weight of (($A_1$)+B) = 0.07–0.6.

* * * * *